(12) United States Patent
Shibusaka et al.

(10) Patent No.: US 6,330,120 B1
(45) Date of Patent: Dec. 11, 2001

(54) ACTUATOR FOR OBJECTIVE LENSES

(75) Inventors: Akio Shibusaka; Hidemi Haga; Jun Tominaga, all of Yokohama (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 09/582,491

(22) PCT Filed: Dec. 21, 1998

(86) PCT No.: PCT/JP98/05783

§ 371 Date: Jun. 26, 2000

§ 102(e) Date: Jun. 26, 2000

(87) PCT Pub. No.: WO99/34360

PCT Pub. Date: Jul. 8, 1999

(30) Foreign Application Priority Data

Dec. 26, 1997 (JP) .................................................. 9-359561

(51) Int. Cl.$^7$ ...................................................... G02B 7/02
(52) U.S. Cl. ........................... 359/814; 359/813; 359/824
(58) Field of Search ..................................... 359/813, 814, 359/822, 823, 824; 369/44.15, 44.16, 246, 247, 248

(56) References Cited

U.S. PATENT DOCUMENTS

| | | | | |
|---|---|---|---|---|
| 5,579,176 | * | 11/1996 | Ikegame et al. ...................... | 359/822 |
| 6,163,416 | * | 12/2000 | Uekusa et al. ......................... | 359/813 |
| 6,259,671 | * | 7/2001 | Shibusaka ............................. | 369/247 |

FOREIGN PATENT DOCUMENTS

| | | |
|---|---|---|
| 62145540 A | 6/1987 | (JP) . |
| 3125337 A | 5/1991 | (JP) . |
| 2521564 | 10/1992 | (JP) . |
| 5076331 A | 3/1993 | (JP) . |
| 7105551 A | 4/1995 | (JP) . |
| 8194960 A | 7/1996 | (JP) . |

OTHER PUBLICATIONS

Microfilm of the specification and drawings first annexed to the request of Japanese Utility Model Application No. 403549/1990 (Laid–open No. 90015/1992), Aug. 6, 1992.
Patent Abstracts of Japan, JP62145540A, http://www.patents.ibm.com/cgi–bin/viewpat.cmd/JP62145540A2, JPO & Japio, 1987, 1$^{st}$ p.
Patent Abstracts of Japan, JP3125337A, http://www.patents.ibm.com/cgi–bin/viewpat.cmd/JP03125337A2, JPO & Japio, 1991, 1$^{st}$ p.
Patent Abstracts of Japan, JP5076331A, http://www.patents.ibm.com/cgi–bin/viewpat.cmd/JP05076331A2, JPO & Japio, 1993, 1$^{st}$ p.
Patent Abstracts of Japan, JP7105551A2, http://www.patents.ibm.com/cgi–bin/viewpat.cmd/JP07105551A2, JPO, 1995, 1$^{st}$ p.
Patent Abstracts of Japan, JP8194960A, http://www.patents.ibm.com/cgi–bin/viewpat.cmd/JP08194960A2, JPO, 1996, 1$^{st}$ p.

* cited by examiner

Primary Examiner—Georgia Epps
Assistant Examiner—Saeed Seyrafi
(74) Attorney, Agent, or Firm—Skjerven Morrill MacPherson LLP

(57) ABSTRACT

A resilient support member 5 is provided between a lens holder 2 and a base member 4 to resiliently support the lens retainer 2 with respect to the base member 4. A pair of auxiliary damping members 10a and 10b extend along the length of the resilient support member 5, and a viscoelastic material piece 11 is provided between the two auxiliary damping members so as to connect them to each other. Various modes of connection can be achieved, and the freedom in the tuning of the damping effect is increased for reducing spurious resonant vibrations so that an adequate damping effect can be achieved. Because the part to which the viscoelastic material is to be applied is placed in a wide space remote from the lens retainer and the base member, the work of applying the viscoelastic material is simplified.

11 Claims, 4 Drawing Sheets

US 6,330,120 B1

ACTUATOR FOR OBJECTIVE LENSES

TECHNICAL FIELD

The present invention relates to an object lens actuator for use in optical disk devices and other applications.

BACKGROUND OF THE INVENTION

As a support structure for an object lens actuator for optical disk devices, it is conventionally known to resiliently support a lens holder retaining an object lens with a wire member extending from a base member as disclosed in Japanese UM registration No. 2521564. In this conventional arrangement, a piece of viscoelastic material is used for damping the resonant vibrations of the wire member and other parasitic vibrations.

However, this conventional arrangement has the following problems.

1) Because the viscoelastic material piece is placed adjacent to the mounting part of the wire member, the deformation of the spring member caused by the movement of the holder is relatively small. Therefore, the shear force acting between the wall of the space surrounding the free end of the wire member and the spring member is so small that an adequate damping effect may not be produced.
2) Because of the need to fill the viscoelastic material into the space surrounding the mounting portion of the wire member, the work efficiency is low.
3) Because the viscoelastic material is required to be filled into the space which is larger than the outer profile of the wire member, when the viscoelastic material is required to be cured by ultraviolet radiation, the space is required to be formed with transparent resin material (transmitting ultraviolet radiation) so that there is a restriction on the selection of the resin material.

SUMMARY OF THE INVENTION

To eliminate such problems of the prior art, and achieve an adequate damping effect while improving the work efficiency in forming the damping means, the present invention provides an object lens actuator, comprising a lens holder retaining an object lens, a resilient support member extending from a base member toward the lens holder for resiliently supporting the lens holder with respect to the base member, and drive means for actuating the lens holder in focusing and tracking directions, further comprising: an auxiliary damping member extending from at least one of the lens holder and the base member along the length of the resilient support member; and damper means provided between the resilient support member and the auxiliary damping member or between two of the auxiliary damping members; or further comprising a pair of auxiliary damping members extending from the lens holder and base member, respectively, along the length of the resilient support member; and damper means provided between the opposing ends of the auxiliary damping member.

DETAILED DESCRIPTION OF THE PREFERRED EMBODIMENTS

Figure 1:
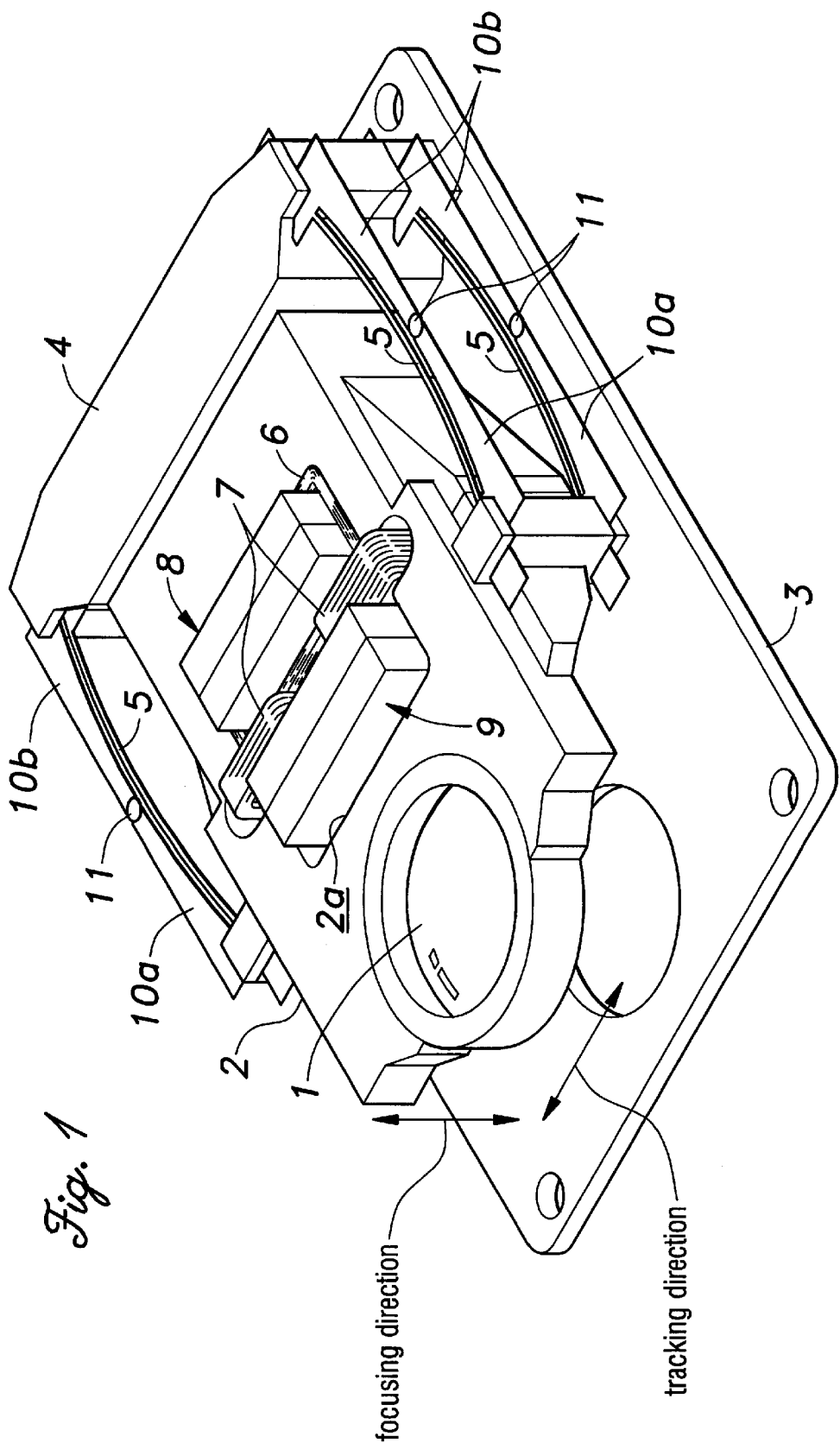
FIG. 1 is a perspective view of an essential part of an optical head embodying the present invention.
Figure 2:
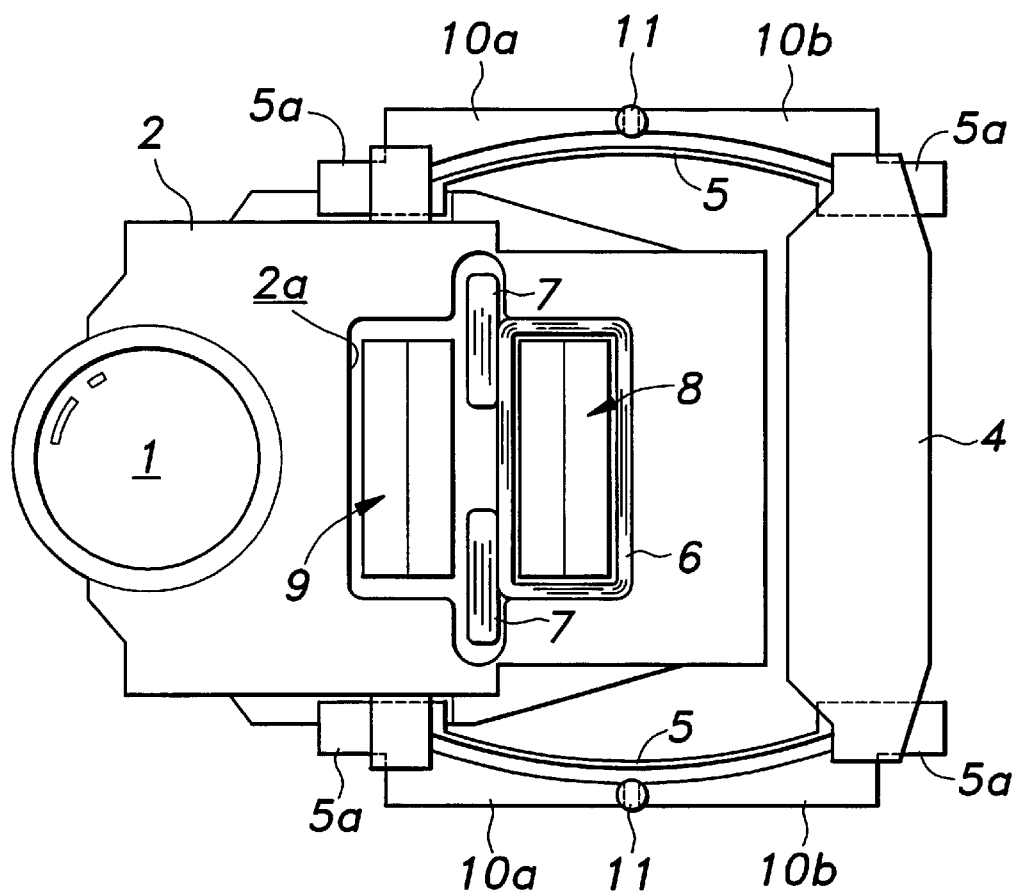
FIG. 2 is a plan view of an essential part of the optical head of FIG. 1.

FIG. 1 is a perspective view of an essential part of an optical head for optical disk devices and magneto-optical disk devices embodying the present invention, and FIG. 2 is a plan view of the same. This optical head comprises a block-shaped lens holder 2 adapted to retain an object lens 1, and four band-shaped resilient support members 5 which, for resiliently supporting the lens holder 2 with respect to a wall-like base member 4 standing upright from a mounting plate 3, extend from the base member 4 substantially in parallel with the mounting plate 3, one above the other on either side of the lens holder 2, and attached to intermediate parts of the lens holder 2 on either side of the lens holder 2 at their free ends.

The object lens 1 is mounted to an end portion of the lens holder 2 remote from the base member 4 with its optical axial line directed perpendicularly to the major surface of the mounting plate 3. The mounting plate 3 is actuated by a drive device provided in a device main body not shown in the drawing for a rough positioning action.

An intermediate part of the lens holder 2 is provided with a through hole 2a extending substantially perpendicularly to the extending direction of the resilient support members 5. A rectangular annular focusing coil 6 is fitted in a part of this through hole 2a adjacent to the base member 4 and a pair of tracking coils 7 are attached to the front face (facing the object lens 1) of the focusing coil 6 one next to the other. Magnet units 8 and 9 each consisting of a yoke and a permanent magnet are attached to the mounting plate 3 in an upright orientation. One of the magnet units 8 is passed into the focusing coil 6. The other magnet unit 9 is passed into the part of the through hole 2a defining a certain area offset from the focusing coil 6 toward the side of the object lens 1, and faces the tracking coils 7. The focusing coil 6 and tracking coils 7 form the drive means jointly with the magnet units 8 and 9.

Figure 3:
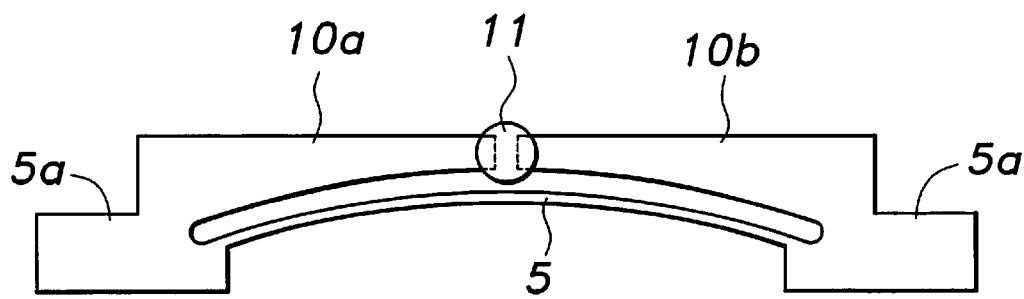
FIG. 3 is a view showing the resilient support member and the auxiliary damping members embodying the present invention.

The resilient support members 5 are each formed by cutting out a single sheet spring member along arcuate paths as shown in FIG. 3, and, in its mounted state, presents a convex profile in the tracking direction while extending in parallel with the major surface of the mounting plate 3. The resilient support members 5 are each provided with mounting pieces 5a at longitudinal ends thereof for attachment to the lens holder 2 and the base member 4, respectively A pair of auxiliary damping members 10a and 10b are cut out from the same sheet spring member as the resilient support member 5, and extend from the mounting pieces 5a toward each other and along the length of the resilient support member 5.

In the embodiment shown in FIGS. 1 and 2, the free ends of the two auxiliary damping members 10a and 10b oppose each other, and a viscoelastic material piece 11 is provided between the free ends so as to connect the free ends to each other with the viscoelastic material piece 11. According to this embodiment, because the resilient support member 5 and the auxiliary damping members 10a and 10b are formed integrally to one another, it is possible to form both the part for supporting the lens holder 2 so as to be moveable in the focusing and tracking directions, and the auxiliary function for damping a spring-mass system with a single member.

When the object lens actuator is actuated in the focusing or tracking direction, a relative displacement is produced between the auxiliary damping member 10a on the side of the lens holder 2 and the auxiliary damping member 10b on the side of the base member 4, and the viscoelastic material piece 11 produces a damping effect owing to the shear force which is produced in the viscoelastic material piece 11 extending between the free ends.

Because the viscoelastic material piece 11 is provided in an intermediate part which is remote from both the lens holder 2 and the base member 4, the work of applying the viscoelastic material can be conducted in a relatively wide open space as opposed to the enclosed space of the prior art, and the work efficiency can be improved. Also, when the viscoelastic material piece 11 consists of a material which is required to be cured by ultraviolet radiation, because there is nothing to obstruct ultraviolet radiation, the work efficiency of ultraviolet radiation can be improved, and the curing process can be conducted in a stable manner.

In the embodiment described above, the resilient support member 5 for supporting the lens holder in the focusing and tracking directions was curved at a certain curvature so that the axial (longitudinal) compliance of the resilient support member 5 may be increased although they may simply extend straight without departing from the spirit of the present invention. As a result, spurious resonant frequencies of pitching, yawing and other motions of the spring-mass system are shifted toward lower frequency ranges as opposed to the case of a resilient support member having no such curvature. In general, the damping effect of a damping material depends on the frequency, and diminishes as the frequency gets higher. Therefore, by providing a curvature to the resilient support member 5 and thereby lowering the spurious resonant frequencies of the spring-mass system, the damping effect can be enhanced.

The present invention is not limited by the foregoing embodiment, but may be implemented in various other different arrangements. Some of such possible embodiments of the present invention are described in the following.

Figure 4:
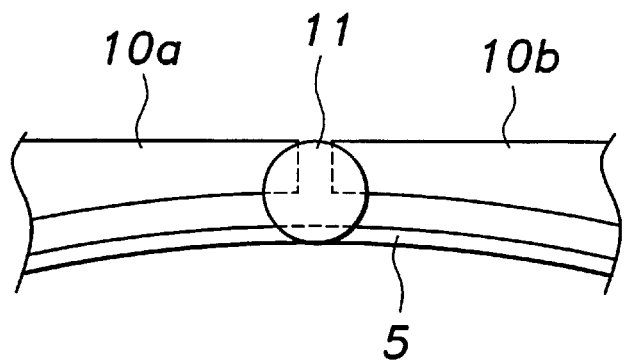
FIG. 4 is an enlarged view of an essential part similar to FIG. 3 showing a second embodiment of the present invention.
Figure 5:
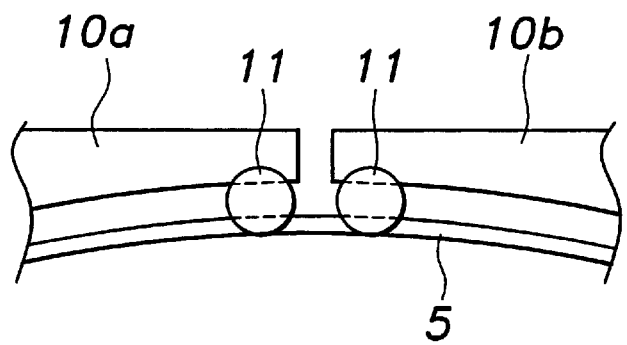
FIG. 5 is an enlarged view of an essential part similar to FIG. 3 showing a third embodiment of the present invention.

FIGS. 4 and 5 are views similar to FIG. 3 showing essential parts of the resilient support member 5 and the auxiliary damping members 10a and 10b. In the embodiment illustrated in FIG. 4, the viscoelastic material piece 11 not only connects the free ends of the two auxiliary damping members 10a and 10b, but also connects a corresponding part of the resilient support member 5 to the auxiliary damping members 10a and 10b. In the embodiment illustrated in FIG. 5, instead of directly connecting the free ends of the auxiliary damping members 10a and 10b with the viscoelastic material piece 11, the free ends of the auxiliary damping members 10a and 10b are individually connected to the opposing parts of the resilient support member 5 with the viscoelastic material piece 11. These illustrated embodiments allow the damping effect to be freely tuned, and increase the freedom of design so that the device may be readily adapted to each particular need.

Figure 6:
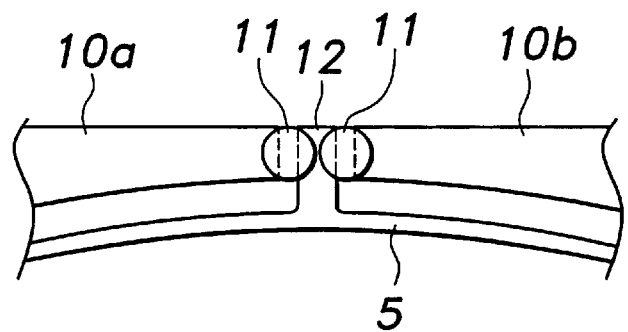
FIG. 6 is an enlarged view of an essential part similar to FIG. 3 showing a fourth embodiment of the present invention.

In the embodiment illustrated in FIG. 6, the resilient support member 5 is provided with a projection 12 which fits into a gap defined between the opposing free ends of the auxiliary damping members 10a and 10b, and the projection 12 is individually connected to the free ends of the auxiliary damping members 10a and 10b with two separate pieces of the viscoelastic material 11. This increases the roll rigidity of the lens holder 2, and contributes to the reduction of spurious resonant vibrations.

Figure 7:
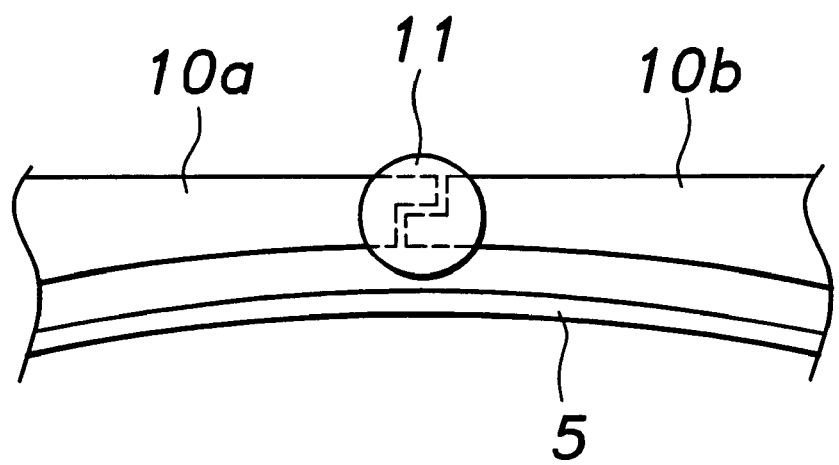
FIG. 7 is an enlarged view of an essential part similar to FIG. 3 showing a fifth embodiment of the present invention.

In the embodiment illustrated in FIG. 7, the opposing free ends of the auxiliary damping members 10a and 10b are provided with mutually complementary step-shaped edges so that the step-shaped free ends interdigitate. The viscoelastic material piece 11 extends between the step-shaped free ends.

The embodiments illustrated in FIGS. 4 to 7 provide similar advantages as the first embodiment. In the embodiments illustrated in FIGS. 4 to 6, the auxiliary damping members extended from both the lens holder 2 and the base member 4 in a pair, but the auxiliary damping member may also extend only from one of them or extend from both the lens holder 2 and the base member 4 by different lengths. The viscoelastic material piece 11 was provided only in a part of the entire length of the resilient support member in the above described embodiments, but may also be provided over the entire length of the resilient support member.

The resilient support member 5 and the auxiliary damping members 10a and 10b were formed from the same blank, but may also be formed from different blanks. Even in the latter case, similar advantages can be obtained.

INDUSTRIAL APPLICABILITY

Because the damping member extends from one of the lens holder and the base member and a damping material piece is provided between the resilient support member and the auxiliary damping member, or the auxiliary damping members extend from the lens holder and the base member in a pair, respectively, and a damping material piece is provided between the free ends of the auxiliary damping members, the viscoelastic material can be applied in various different ways. Therefore, the damping effect can be freely tuned, and the freedom of design is increase so that an adequate damping effect can be achieved. Also, because the work of applying the viscoelastic material can be conducted in a relatively wide open space remote from both the lens holder 2 and the base member 4, the work efficiency can be improved.

What is claimed is:

1. An object lens actuator, comprising a lens holder retaining an object lens, a resilient support member extending from a base member toward the lens holder for resiliently supporting the lens holder with respect to the base member, and drive means for actuating the lens holder in focusing and tracking directions, further comprising:

a pair of auxiliary damping members extending from the lens holder and the base member, respectively, along the length of the resilient support member so as to oppose each other and define a gap between them; and damper means provided between the resilient support member and the auxiliary damping members.

2. An object lens actuator according to claim 1, wherein the resilient support member and the auxiliary damping members are formed integrally to each other.

3. An object lens actuator according to claim 1, wherein the resilient support member curves so as to face a convex part thereof in the tracking direction.

4. An object lens actuator according to claim 1, wherein the damper means connects the opposing ends of the auxiliary damping members.

5. An object lens actuator according to claim 1, wherein the resilient support member is provided with a projection which extends into the gap between the opposing ends of the auxiliary damping members, and the damper means is provided between the projection and the free end of each of the auxiliary damping members.

6. An object lens actuator, comprising a lens holder retaining an object lens, a resilient support member extending from a base member toward the lens holder for resiliently supporting the lens holder with respect to the base member, and drive means for actuating the lens holder in focusing and tracking directions, further comprising:

a pair of auxiliary damping members extending from the lens holder and the base member, respectively, along the length of the resilient support member so as to oppose each other and define a gap between them; and damper means provided between the opposing ends of the auxiliary damping members.

7. An object lens actuator according to claim 6, wherein the resilient support member and the auxiliary damping members are formed integrally to each other.

8. An object lens actuator according to claim 6, wherein the resilient support member curves so as to face a convex part thereof in the tracking direction.

9. An object lens actuator according to claim 6, wherein the opposing free ends of the auxiliary damping members are provided with mutually complementary stepshaped edges.

10. An object lens actuator according to claim 6, wherein the opposing free ends of the auxiliary damping members oppose each other adjacent to a middle point between the lens holder and the base member.

11. An object lens actuator, comprising a lens holder retaining an object lens, a resilient support member extending from a base member toward the lens holder for resiliently supporting the lens holder with respect to the base member, and drive means for actuating the lens holder in focusing and tracking directions, further comprising:

an auxiliary damping member extending from at least one of the lens holder and the base member along the length of the resilient support member; and damper means provided between the resilient support member and the auxiliary damping member or between two of the auxiliary damping members;

the resilient support member curving so as to face a convex part thereof in the tracking direction.

* * * * *